United States Patent

Kreger

[11] 3,907,199
[45] Sept. 23, 1975

[54] COMBINATION ENGINE COOLING SYSTEM AND PASSENGER COMPARTMENT HEATING SYSTEM FOR AN AUTOMOTIVE VEHICLE

[75] Inventor: Thomas C. Kreger, Clarkston, Mich.

[73] Assignee: Ford Motor Company, Dearborn, Mich.

[22] Filed: Nov. 18, 1974

[21] Appl. No.: 525,033

[52] U.S. Cl.................. 237/12.3 B; 165/33; 165/36; 236/34.5
[51] Int. Cl.² ........................................... B60H 1/02
[58] Field of Search......... 237/12.3 B; 236/34.5, 34; 165/33, 36; 123/41.1, 41.29

[56] References Cited
UNITED STATES PATENTS

| | | | |
|---|---|---|---|
| 2,408,269 | 9/1946 | Peterson | 236/34 |
| 2,425,439 | 8/1947 | Puster | 236/34.5 |
| 2,754,062 | 7/1956 | Von Wangenheim | 236/34.5 |
| 2,988,280 | 6/1961 | Kimm et al. | 236/34.5 |
| 3,313,483 | 4/1967 | Nallinger | 236/34.5 |
| 3,741,477 | 6/1973 | Sparks | 236/34.5 X |
| 3,851,629 | 12/1974 | Maur et al | 237/12.3 B X |

Primary Examiner—William E. Wayner
Assistant Examiner—W. E. Tapolcai, Jr.
Attorney, Agent, or Firm—Roger E. Erickson; Keith L. Zerschling

[57] ABSTRACT

A combination engine cooling and passenger compartment heating system for an automotive vehicle, particularly suited for use with a Stirling engine. The system includes engine coolant temperature control means which permits the coolant temperature to rise to a predetermined magnitude as quickly as possible and maintains the coolant at that temperature. The control means also permits selective apportionment of engine coolant between the radiator and the heater to regulate the heat to the automobile passenger compartment and to lower the coolant temperature whenever possible. The preferred embodiment includes a control valve having a first thermostatic power source responsive to coolant temperature and a second thermostatic power source responsive to the vehicle operator or a signal other than the coolant temperature.

9 Claims, 4 Drawing Figures

COMBINATION ENGINE COOLING SYSTEM AND PASSENGER COMPARTMENT HEATING SYSTEM FOR AN AUTOMOTIVE VEHICLE

BACKGROUND AND SUMMARY OF THE INVENTION

A conventional Otto cycle internal combustion engine utilizes a relatively high coolant temperature as its normal operating temperature. A typical heating system used to heat the passenger compartment of a vehicle with such an engine directs a portion of the coolant flow through the heater core. The coolant temperatures of the engine once normal operating temperatures are reached remain generally within a predetermined range. A Stirling engine is usually designed to operate at coolant temperatures substantially lower than the normal range in conventional Otto cycle engines. While the Stirling engine is well able to withstand higher coolant temperatures such as found in conventional internal combustion engines, it has been found that both the service life and the efficiency of the Stirling engine are increased when such higher temperatures are not continuously maintained and a lower normal operating temperature is utilized except where necessary to achieve maximum heating of the passenger compartment.

This invention provides a combination passenger compartment heating and engine cooling system suitable for use with a Stirling engine in which high coolant temperatures are maintained only as long as necessary to provide adequate heat to the passenger compartment. The invention also provides for a reduction in passenger compartment heat by a reduction in engine coolant temperature. The invention further provides apparatus which maintains a moderate engine coolant temperature, significantly lower than that of a conventional internal combustion engine, when little or no heat is required for the passenger compartment. This invention also provides an automobile heater system having an engine coolant temperature control valve which is responsive to coolant temperature as well as signals transmitted from the vehicle operator or other sources external to the coolant flow temperatures.

A combination passenger compartment heating and engine cooling system constructed in accordance with this invention includes a radiator, a heater and a flow control valve which apportions coolant flow between the heater and the radiator. The flow control valve includes a housing having a coolant inlet and a first outlet to the radiator and a second outlet to the heater. A movable valve element is constructed to move from a first extreme position blocking the first outlet and opening the second outlet to a second extreme position blocking the second outlet and opening the first outlet. A thermal power element or motor is connected to the movable valve element and is constructed to displace the valve element from the first extreme position to a position intermediate the first and second extreme positions in response to an increase in coolant temperature. A second motor is constructed to displace the movable valve element toward the second extreme position in response to a signal other than coolant temperature. The valve element is displaceable to the second extreme position when both of the first and second motors are actuated.

DETAILED DESCRIPTION OF THE PREFERRED EMBODIMENT

Figure 1:
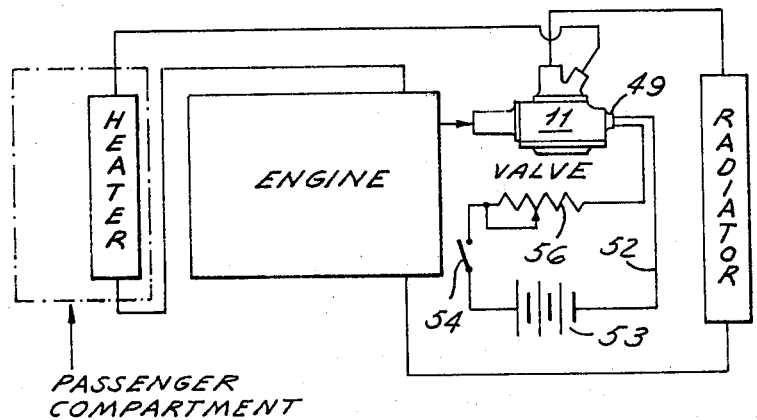
FIG. 1 is a schematic view of a combination passenger compartment heating and engine cooling system constructed in accordance with this invention.

FIG. 1 of the drawing illustrates schematically an engine, a combination engine cooling system and passenger compartment heating system. The system is particularly suitable for a Stirling engine or another engine requiring generally lower sustained cooling temperatures than a conventional Otto cycle engine. The engine is of the type having internal cooling passages through which a liquid coolant is circulated. A radiator is positioned at the front of the automotive vehicle comprising a liquid to air heat exchange in which air is moved past the radiator by a fan or the movement of the vehicle. A heater is positioned within the passenger compartment of the vehicle and also is a liquid to air heat exchanger in which air movement through the heater core is induced by means of a fan (not shown).

Figure 3:
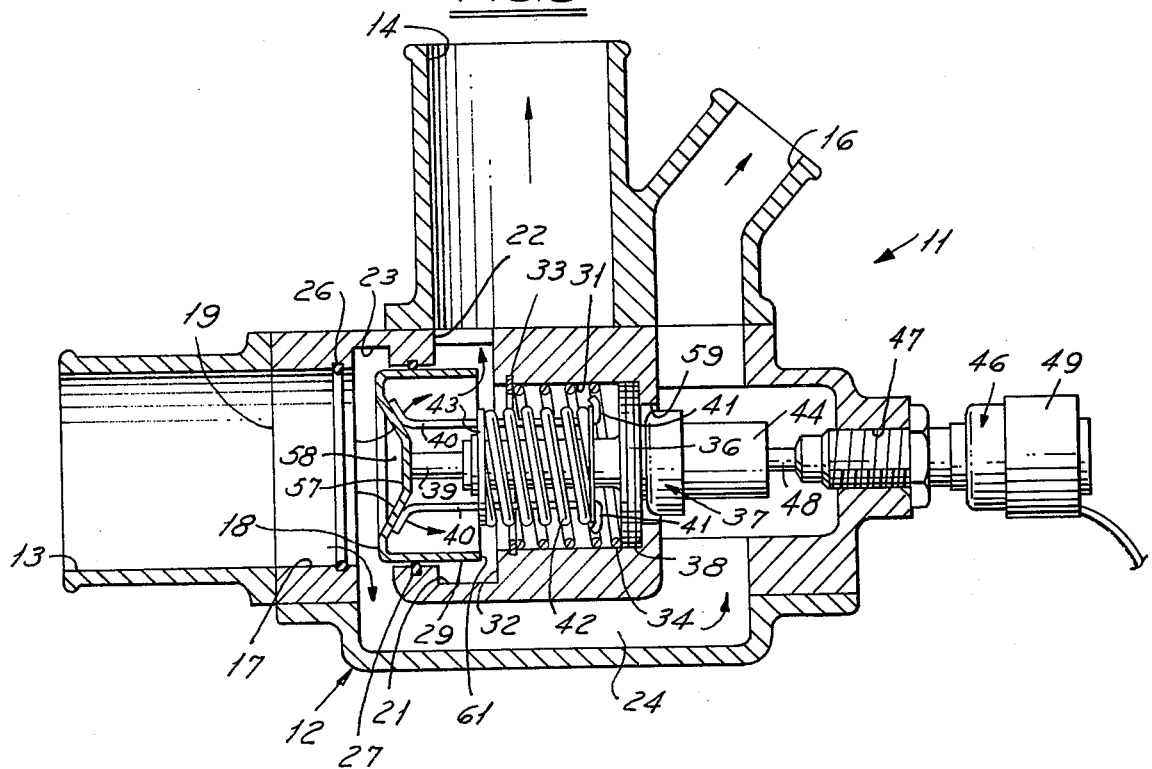
FIG. 3 is a cross sectional view of the control valve having its movable elements in positions reflecting a fully warm coolant.
Figure 4:
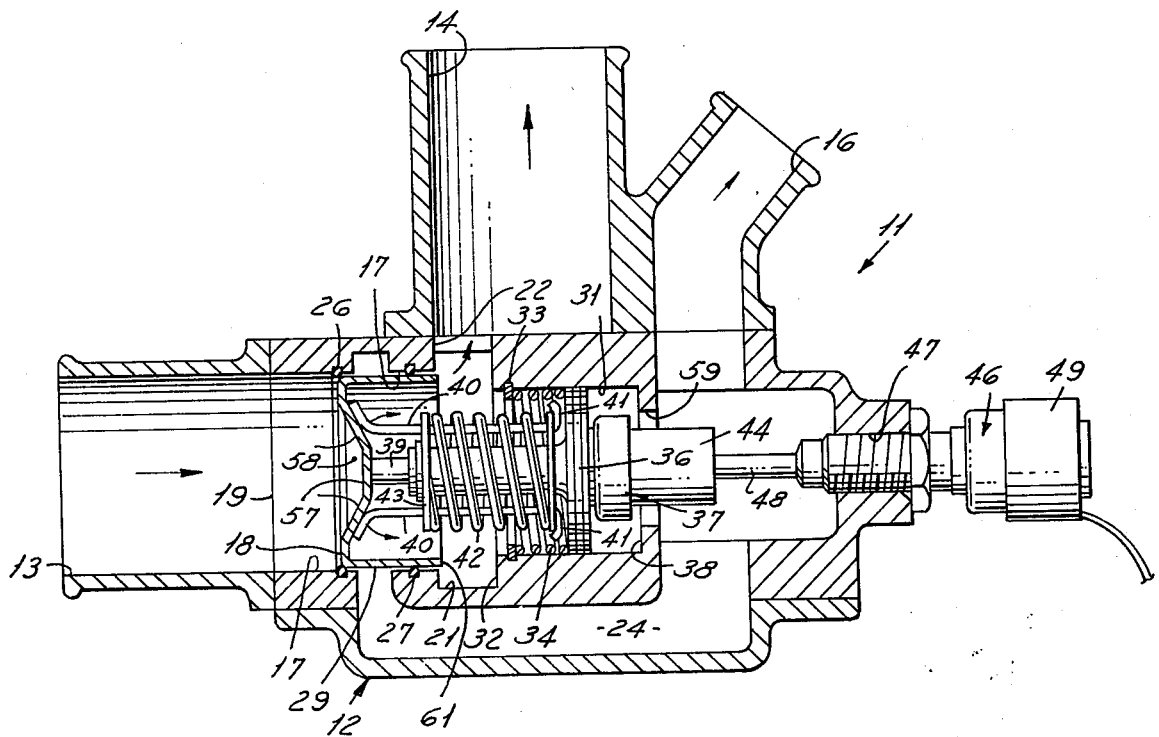
FIG. 4 is a cross sectional view of the control valve having its movable elements in positions reflecting a fully warmed coolant and the heater "off".

The control valve 11 of the system includes a housing 12 having an inlet 13 receiving coolant from the engine and a pair of outlets 14 and 16 discharging coolant to the radiator and the heater, respectively. The housing includes a bore 17 which slidably receives a piston or movable valve element 18. The first end 19 of the bore joins the inlet 13. An annular recess 21 and passage 22 join the interior of bore 17 with the outlet 14 to the radiator. A second annular recess 23 is positioned between the first annular recess and the inlet 13 and with passage 24 joins second outlet 16 with bore 17. A pair of O-rings 26 and 27 are received in relatively small cylindrical annular recesses on either side of the recess 23. One or both of the O-rings sealingly engage the cylindrical portion 29 of piston 18 when the piston is displaced leftwardly as shown in FIGS. 3 or 4 of the drawings.

A second, reduced diameter bore 31 is formed in the housing and opens into the first bore 17. An annular shoulder 32 is formed between the two bores. A second piston 36 is slidingly and sealingly received within the second bore 31. A thermal power means or motor 37 is mounted to the second piston. A coiled compression spring 34 acts between the second piston 36 and a snap ring 33 received within an annular groove formed in bore 31 adjacent shoulder 32. The spring 34 urges piston 36 toward a normal position against the end 38 of bore 31.

The first piston 18 includes a cup-shaped portion having a cylindrical surface 29 slidingly engaging bore 17 and seals 26 and 27. A portion 57 of the piston end is displaced from the remainder of the end and provides a passage 58 through the piston. A pair of fingers 40 are secured to portion 57 and extend axially along and on either side of thermal power member 37. The fingers 40 have radially outwardly extending tabs 41. A second coil spring 42 is compressed between the tabs 41 and a washer 43. The washer is secured to the housing of thermal power member 37 and includes recesses or voids which slidably receive the fingers 40 of piston 18. Consequently, spring 42 biases the piston 18 rightwardly as shown in the drawings and urges the plunger 39 of power member 37 toward a retracted position.

The temperature sensitive portion 44 of the thermal power member 37 is in communication with the coolant passage 24 through opening 59 of the housing. The movable plunger element 39 of the power member 37 protrudes from the body of member 37 against portion 57 of the piston 18 to move the piston leftwardly (as viewed in the drawings) in response to an increase in coolant temperature.

A second thermal power member or motor 46 is threadedly received within a bore 47 formed in the righthand end of the valve housing 12. The threaded bore 47 is coaxial with bores 17 and 31. A movable plunger element 48 of the second power means engages the body of the first power member 37. A resistance heater 49 is positioned about the body of the power member 37. When current flows through the heater 49 the element 48 protrudes from the body of power member and displaces the first power member 37 and the second piston 36 leftwardly against the force of spring 34.

The resistance heater 49 is an element of a circuit 52 which also includes a source of electrical energy 53, such as a battery, a switch 54 and a means 56 to vary the current flow to the heater 49, such as a variable resistor.

The operation of the above described passenger compartment heater and engine cooling system can best be understood by considering the system first under cold starting conditions, next with a fully warmed engine and maximum heat to the passenger compartment and finally with a fully warmed engine and no heat to the passenger compartment.

Figure 2:
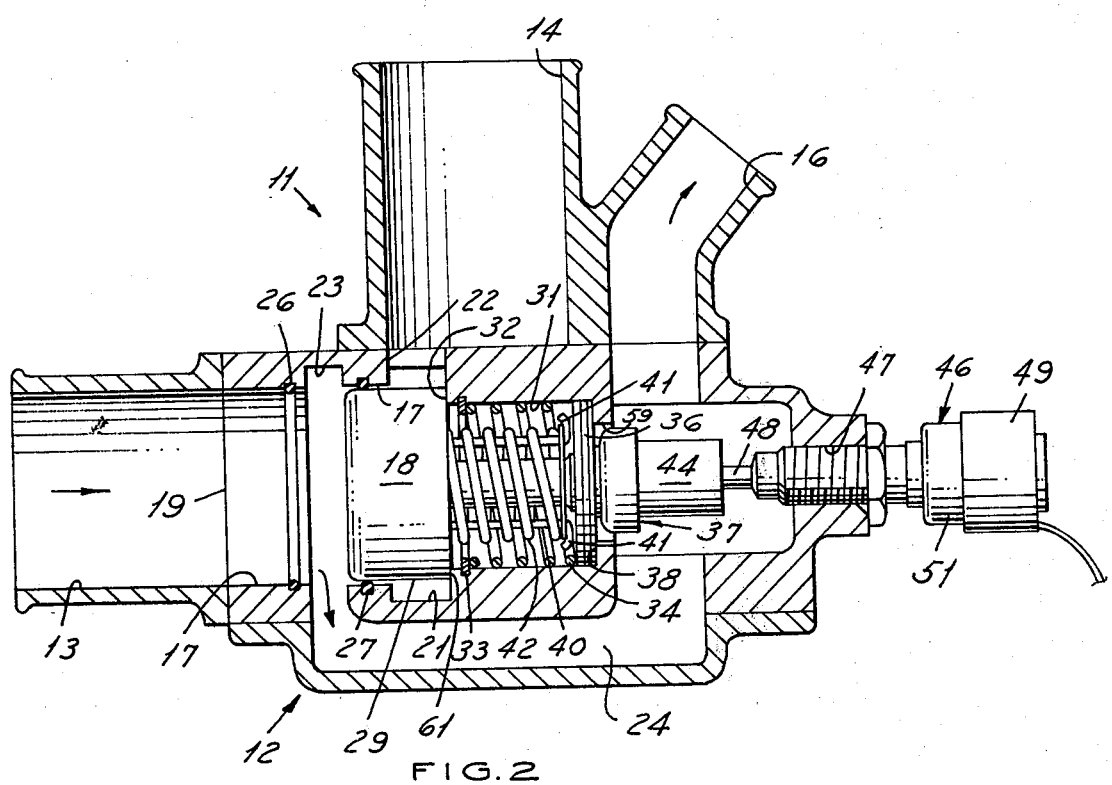
FIG. 2 is a cross sectional view of the control valve of the invention having its movable elements in cold start positions.

Under cold starting conditions, the movable valve elements are in the positions shown in FIG. 2 of the drawings. The movable element 39 of thermal power member 37 is retracted because the coolant temperature is cold. The movable element 42 of the power element 46 is likewise retracted because the switch 54 is open and the resistance heater 49 is "off". The piston 18 is, therefore, in its extreme rightward position. The passage 24 between the coolant inlet 13 and the outlet 16 to the passenger compartment heater is open, while the passage 22 between the inlet 13 and the outlet 14 to the radiator is blocked by sealing engagement of the righthand circular edge 61 of piston 18 against shoulder 32. It may be seen that under cold starting conditions, all of the coolant flow is directed to the passenger compartment heater. This will provide maximum heat to the passenger compartment in the minimum amount of time.

As the engine continues to operate the coolant is warmed by the heat of combustion and the plunger element 39 of the thermal power member 37 is displaced leftwardly to reflect the increase in coolant temperature in passage 24. When the engine is fully warmed the movable elements of the valve 11 are in the positions shown by FIG. 3 of the drawings. The piston 18 is displaced by the power element 37 to an intermediate position in which the coolant flow is divided between the outlet 14 to the radiator and the outet 16 to the passenger compartment heater. The power member 37 is calibrated to maintain a predetermined maximum coolant temperature by apportioning coolant flow between the radiator and passenger compartment heater. The radiator is designed to have a significantly greater heat transfer capacity than the passenger compartment heater; therefore, if the coolant temperature rises above the calibrated temperature of power member 37 the piston 18 will be displaced leftwardly to increase the flow of coolant through the radiator. The valve elements in the positions of FIG. 3 provide maximum heat to the passenger compartment heater.

Assume that the engine is fully warmed and that maximum heat is being furnished to the passenger compartment (as when the valve elements are in the positions of FIG. 3). The vehicle operator may reduce the amount of heat to the passenger compartment by operating a temperature control that closes the switch 54 and adjusts the current varying means 56 in accordance with the desired passenger compartment temperature. Current flow in the circuit 52 causes the resistance heater 49 to heat the temperature sensitive portion of second thermal power member 46. The plunger element 48 is thus displaced leftwardly which causes the first thermal power member 37, the piston 36 and the piston 18 to be displaced leftwardly a corresponding amount. As the piston 18 is displaced leftwardly, a greater portion of the coolant flow is directed through the radiator and a lesser portion of the coolant flow is directed through the passenger compartment heater. The result is a decrease in heat to the passenger compartment because of both the reduced coolant flow through the heater and the lowered temperature of the coolant. The lowered coolant temperature is a result the greater portion of the coolant flowing through the larger capacity heat exchanger, viz.. the radiator. In FIG. 4 of the drawings, the valve elements are shown in positions in which the entire coolant flow is directed through outlet 14 to the radiator and the passenger compartment heater is "off".

The thermal power members 37 and 46 may be typical wax pellet motors in which displacement is directly proportional to changes in temperature, such as are found in many conventional engine coolant thermostats.

It can be seen that the passenger compartment heating and engine cooling system described above provides maximum initial passenger compartment heating followed by a reduction in engine coolant temperature as soon as the passenger compartment reaches a selected temperature determined either by the vehicle operator or a thermostatic control means (not shown).

Modifications and alterations will occur to those skilled in the art which are included within the scope of the following claims.

I claim:

1. In an automotive vehicle having a liquid cooled engine,
 a combination passenger compartment heating and engine cooling system comprising
 a passenger compartment heater,
 a radiator,
 a flow control valve having an inlet and first and second outlets,
 first liquid conduit means conducting liquid from the engine to the valve inlet, second liquid conduit means connecting in series said first outlet of said valve and said radiator and said engine, third liquid conduit means connecting in series said second outlet of said valve and said heater and said engine, said flow control valve including a housing, said inlet and said first and second outlets being formed in said housing, movable means constructed to move from a first extreme position blocking said first outlet from said inlet and connecting said second outlet and said inlet to a second extreme position blocking said second outlet from said inlet and connecting said first outlet and said inlet, first motor means comprising a temperature responsive power member connected to said movable means and constructed to displace said movable means from said first extreme position a first predetermined amount to a position intermediate said first extreme position and said second extreme position in response to an increase in coolant temperature, second motor means constructed to displace said movable means a second predetermined amount toward said second extreme position in response to a signal external to said engine, said first motor means and said second motor means being positioned in series, displacement of said movable means said first predetermined distance and said second predetermined distance from said first extreme position placing said movable means in said second extreme position.

2. The combination of claim 1, said movable means comprising a piston, a cylindrical bore formed in said housing, said piston being slidably received in said cylindrical bore.

3. The combination of claim 2, said inlet opening into one end of said cylindrical bore, first passage means opening from said cylindrical bore and communicating said cylindrical bore and said first outlet, second passage means opening on said cylindrical bore at an axial position intermediate the opening to said first passage means and said inlet.

4. The combination of claim 1, mounting means to slidably mount said first motor means within said housing for movement in the axial direction of said cylinder bore, spring means biasing said first motor means to a normal position relative to said housing, said motor means being displaceable away from said normal position relative to said housing toward said inlet, said second motor means being engageable with said first motor means to displace said first motor means and said movable means relative to said housing.

5. The combination of claim 4, said first and second motor means having a plunger elements displaceable along the axis of said cylindrical bore.

6. The combination of claim 4, a second bore coaxial with said cylindrical bore having a smaller diameter than said cylindrical bore and joining said cylindrical bore at the end opposite said inlet, said mounting means comprising a second piston slidingly received within said second bore, said spring means biasing said second piston against the end of said second bore and away from said inlet.

7. The combination of claim 3, said first motor means including a temperature sensing portion in communication with said second passage means.

8. The combination of claim 1, said second motor means comprising a second temperature responsive power member, a resistance heater mounted on said power member, an electrical circuit including said resistance heater, a source of electrical current and control means to regulate current flow in said circuit.

9. The combination of claim 6, an annular shoulder formed in said housing by the junction of said cylindrical bore and said second bore, passage means formed in said piston communicating one axial side of the piston with the other, said piston engaging said shoulder when in said first extreme position.

* * * * *